United States Patent
Voss et al.

(10) Patent No.: US 11,477,366 B2
(45) Date of Patent: Oct. 18, 2022

(54) SELFIE SETUP AND STOCK VIDEOS CREATION

(71) Applicant: Snap Inc., Santa Monica, CA (US)

(72) Inventors: Jeremy Voss, Los Angeles, CA (US); Dallin Dyer, Saratoga Springs, UT (US)

(73) Assignee: Snap Inc., Santa Monica, CA (US)

( * ) Notice: Subject to any disclaimer, the term of this patent is extended or adjusted under 35 U.S.C. 154(b) by 191 days.

(21) Appl. No.: 16/835,990

(22) Filed: Mar. 31, 2020

(65) Prior Publication Data
US 2021/0306557 A1    Sep. 30, 2021

(51) Int. Cl.
  *H04N 5/232*    (2006.01)
  *G06F 3/0488*   (2022.01)
  *G06V 40/16*    (2022.01)
  *H04L 51/10*    (2022.01)

(52) U.S. Cl.
  CPC ....... *H04N 5/23222* (2013.01); *G06F 3/0488* (2013.01); *G06V 40/165* (2022.01); *G06V 40/166* (2022.01); *H04L 51/10* (2013.01)

(58) Field of Classification Search
  CPC ............. H04N 5/23222; G06F 3/0488; G06K 9/00248; G06K 9/00255; H04L 51/10
  See application file for complete search history.

(56) References Cited

U.S. PATENT DOCUMENTS

2009/0066803 A1* 3/2009 Miyata ............... H04N 5/23222
                                                    348/222.1
2010/0245382 A1    9/2010 Sio
2015/0052462 A1    2/2015 Kulkarni
2017/0024087 A1    1/2017 Pathy et al.
2017/0221244 A1*   8/2017 Hiraga ............... H04N 5/23238
(Continued)

FOREIGN PATENT DOCUMENTS

CN    109120866 A    1/2019
EP    3324606 A1     5/2018
(Continued)

OTHER PUBLICATIONS

Anonymous: "Reface: Face Swap Videos App Download—Android APK", Dec. 23, 2019 (Dec. 23, 2019), XP055801923, Retrieved from the Internet: URL:https://android-apk.net/app/reface-face-swap-videos/1488782587/.
(Continued)

*Primary Examiner* — Lin Ye
*Assistant Examiner* — Fayez A Bhuiyan
(74) *Attorney, Agent, or Firm* — Georgiy L. Khayet

(57) ABSTRACT

A method for operating a messaging system for sending modifiable videos including a self-image of a user is provided. The method includes providing a face outline to assist with taking the self-image. Instructions relating to a light level, a facial expression, a face position, and a face size may be provided to the user. A smile measurement is displayed to enable the user to adjust the current smile level to a target smile level. A stock video may be created using an actor wearing a mask and facing a video camera. The mask is a marker for insertion of the self-image. The stock video is uploaded to a database of stock videos and, after selection by a user, is combined with a self-image to form a personalized video.

20 Claims, 14 Drawing Sheets

(56) References Cited

U.S. PATENT DOCUMENTS

2018/0025750 A1  1/2018  Smith et al.
2018/0352150 A1  12/2018  Purwar et al.
2020/0236297 A1* 7/2020  Shaburov ............... H04N 5/272

FOREIGN PATENT DOCUMENTS

| EP | 3758364 A1 | 12/2020 |
|---|---|---|
| WO | 2018102880 A1 | 6/2018 |
| WO | 2020150690 A2 | 7/2020 |
| WO | 2020150692 A1 | 7/2020 |

OTHER PUBLICATIONS

Jacobs Nicolaas Hendrik: "Using the Magic if to Circumvent the Problems for the Actor Working With Green Screen Technology", Apr. 1, 2013 (Apr. 1, 2013), pp. 1-160, XP055801777, Retrieved from the Internet: URL: https://repository.up.ac.za/bitstream/handle/2263/33361/Jacobs_Using_2013.pdf, p. 30-p. 33.

Martyn Casserly: "How to Make a Christmas Video on iPhone: Elf Yourself. Video Editors & More—Macworld UK", Dec. 13, 2019 (Dec. 13, 2019), XP055801915, Retrieved from the Internet: URL: https://www.macworld.co.uk/how-to/christmas-video-iphone-elf-yourself-3669173/.

* cited by examiner

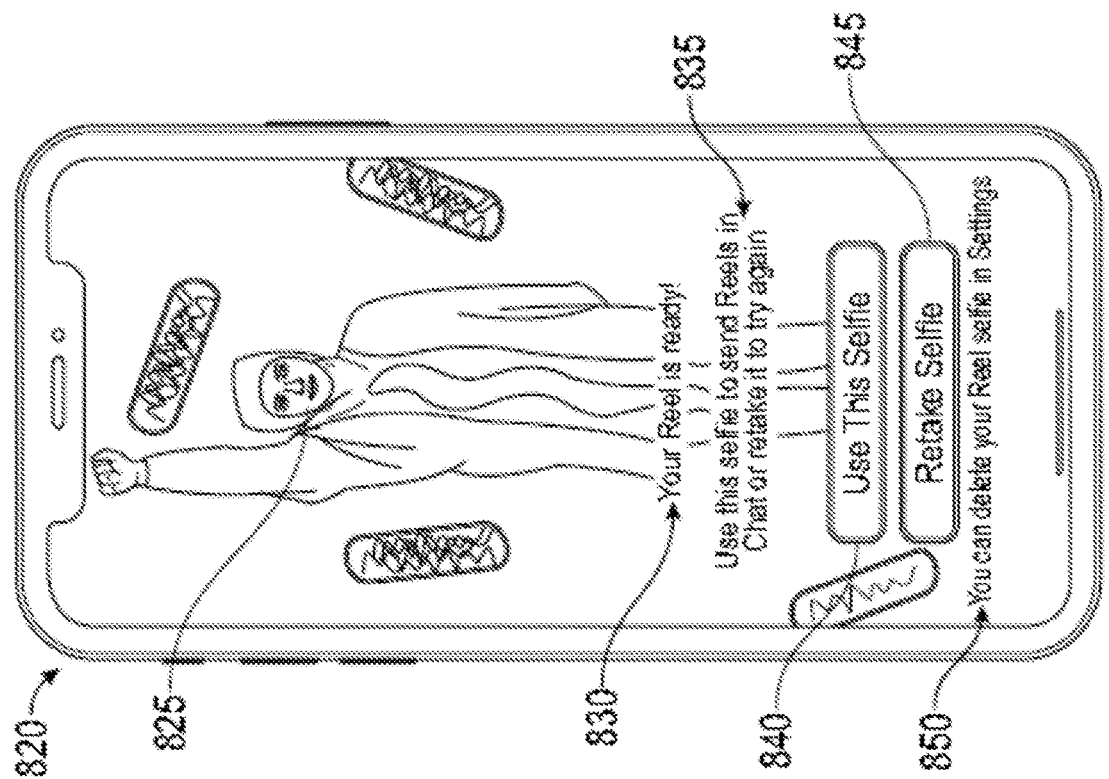
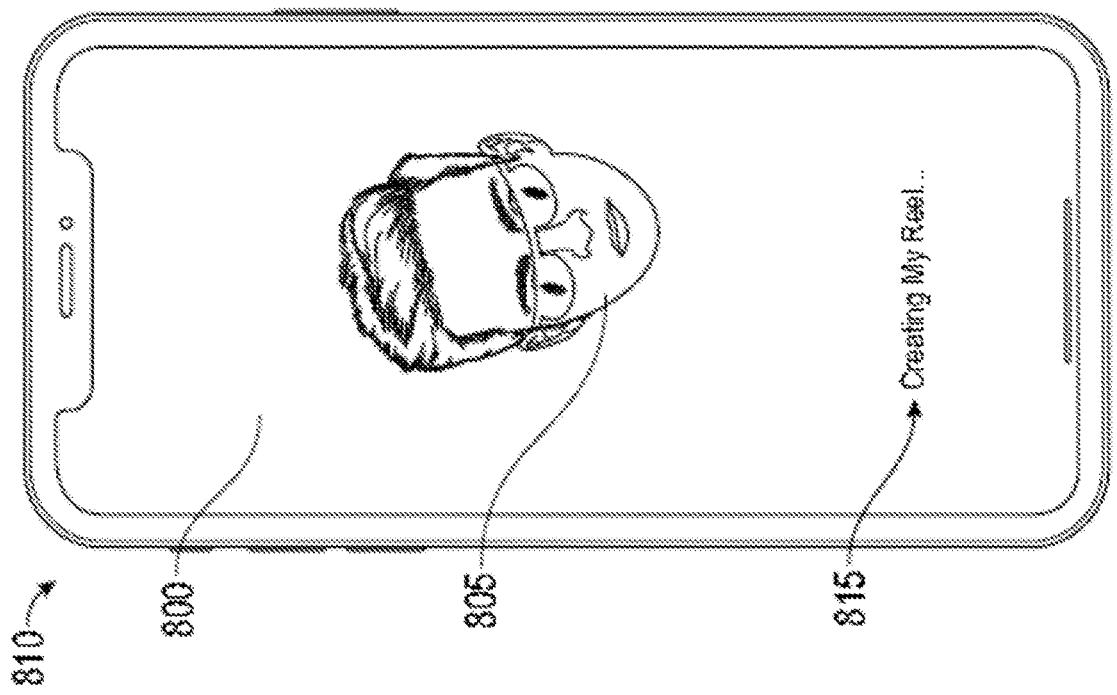
FIG. 8

US 11,477,366 B2

SELFIE SETUP AND STOCK VIDEOS CREATION

TECHNICAL FIELD

This disclosure generally relates to image and video combinations. More particularly, this disclosure relates to methods and systems for self-image formation and stock video creation.

BACKGROUND

Sharing media, such as stickers and emojis, has become a standard option in messaging applications. Currently, some of the messengers provide users with an option for generating and sending images and short videos to other users via a communication chat.

BRIEF DESCRIPTION OF THE DRAWINGS

Embodiments are illustrated by way of example and not limitation in the figures of the accompanying drawings, in which like references indicate similar elements.

FIGS. 6-8 show screens of a user interface of a system for providing personalized videos in a messenger, according to some example embodiments.

DETAILED DESCRIPTION

Figure 1:
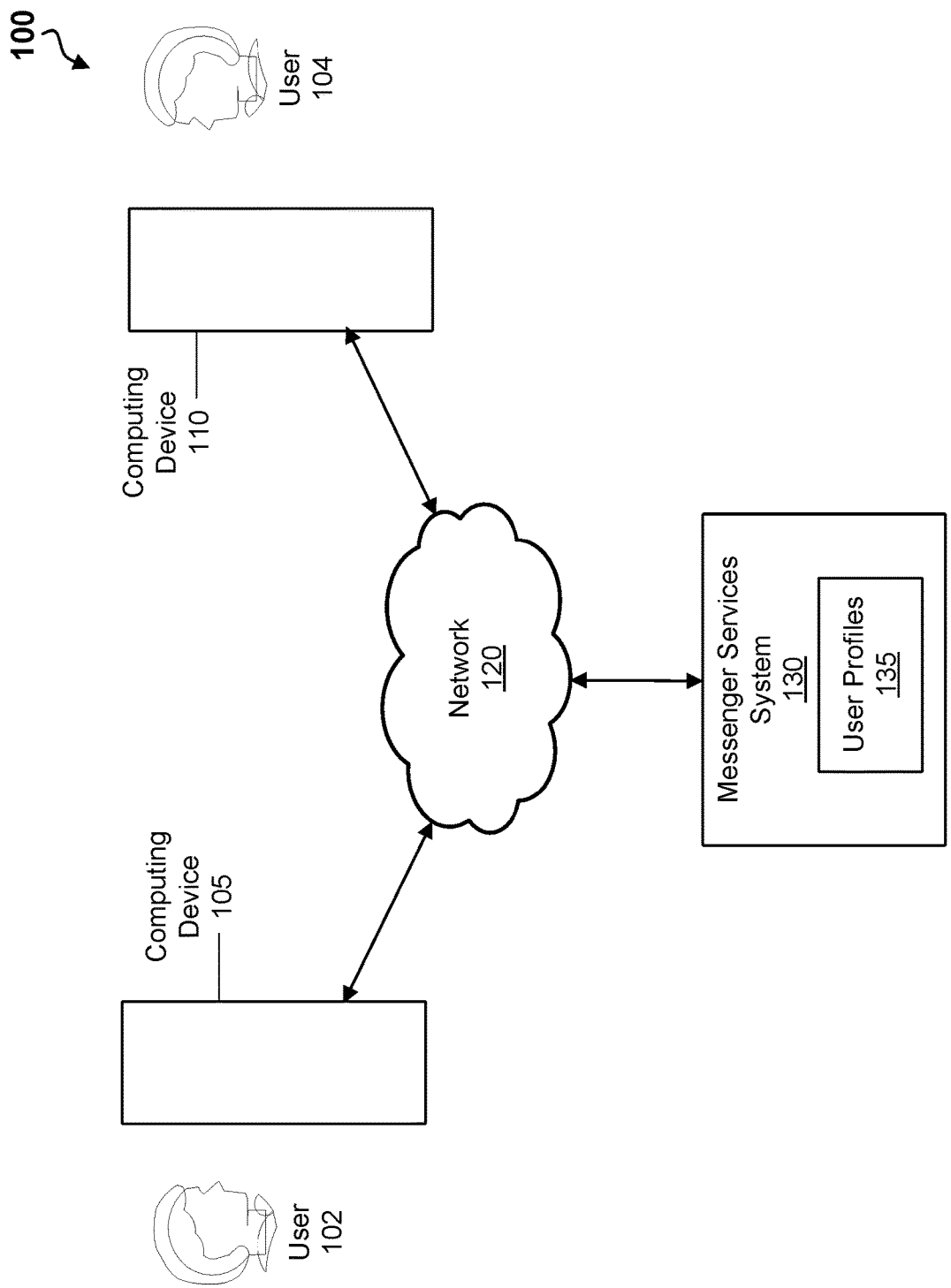
FIG. 1 is a block diagram showing an example environment wherein a system and method for providing personalized videos can be implemented.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

For purposes of this patent document, the term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

This disclosure relates to sending modifiable videos including a self-image. A setup system for selfies provides a live image of a camera view with a face outline at a predetermined position in the camera view. The face outline is an approximate size of a face of the user when the user is using the computing device to take the self-image. The system provides instructions relating to a light level, a facial expression, a face position, or a face size, and may display a smile measurement corresponding to a current smile level of the user. The smile measurement is displayed relative to a target smile level to enable the user to adjust the current smile level to the target smile level.

A stock video is created using an actor wearing a mask and facing a video camera recording the stock video. The mask is a marker for insertion of the self-image. The stock video is uploaded to a database of stock videos, which is accessible by a user to select for combination with the self-image to form a personalized video.

Referring now to the drawings, example embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

FIG. 1 shows an example environment 100, wherein a method for providing personalized videos can be practiced. The environment 100 may include a computing device 105, a user 102, a computing device 110, a user 104, a network 120, and messenger services system 130. The computing device 105 and computing device 110 can refer to a mobile device such as a mobile phone, smartphone, or tablet computer. In further embodiments, however, the computing device 110 can refer to a personal computer, laptop computer, netbook, set top box, television device, multimedia device, personal digital assistant, game console, entertainment system, infotainment system, vehicle computer, or any other computing device.

The computing device 105 and the computer device 110 can be communicatively connected to messenger services system 130 via the network 120. The messenger services system 130 can be implemented as a cloud-based computing resource(s). The messenger services system 130 can include computing resource(s) (hardware and software) available at a remote location and accessible over a network (e.g., the Internet). The cloud-based computing resource(s) can be shared by multiple users and can be dynamically re-allocated based on demand. The cloud-based computing resources can include one or more server farms/clusters including a collection of computer servers which can be co-located with network switches or routers.

The network 120 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, and so forth.

In some embodiments of the disclosure, the computing device 105 can be configured to enable a communication chat between the user 102 and the user 104 of the computing 110. The user 102 and the user 104 may exchange text message and videos during the communication chat. The videos may include personalized videos. The personalized videos can be generated based on pre-generated videos stored in the computing device 105 or the computing device 110. In some embodiments, the pre-generated videos can be stored in the messenger services system 130 and downloaded to the computing device 105 or the computing device 110 on demand.

The messenger services system 130 may be also configured to store user profiles 135. The user profiles 135 may include images of the face of the user 102, images of the face of the user 104, and images of faces of other persons. The images of the faces can be downloaded to the computing device 105 or the computing device 110 on demand and based on permissions. Additionally, the images of the face of the user 102 can be generated using the computing device 105 and stored in a local memory of the computing device 105. The images of the faces can be generated based on other images stored in the computing device 105. The images of the faces can be further used by the computing device 105 to generate personalized videos based on the pre-generated videos. Similarly, the computing device 110 may be used to generate images of the face of the user 104. The images of the face of the user 104 can be used to generate personalized videos on the computing device 110. In further embodiments, the images of the face of user 102 and images of the face of the user 104 can be mutually used to generate personalized videos on the computing device 105 or the computing device 110.

Figure 2:
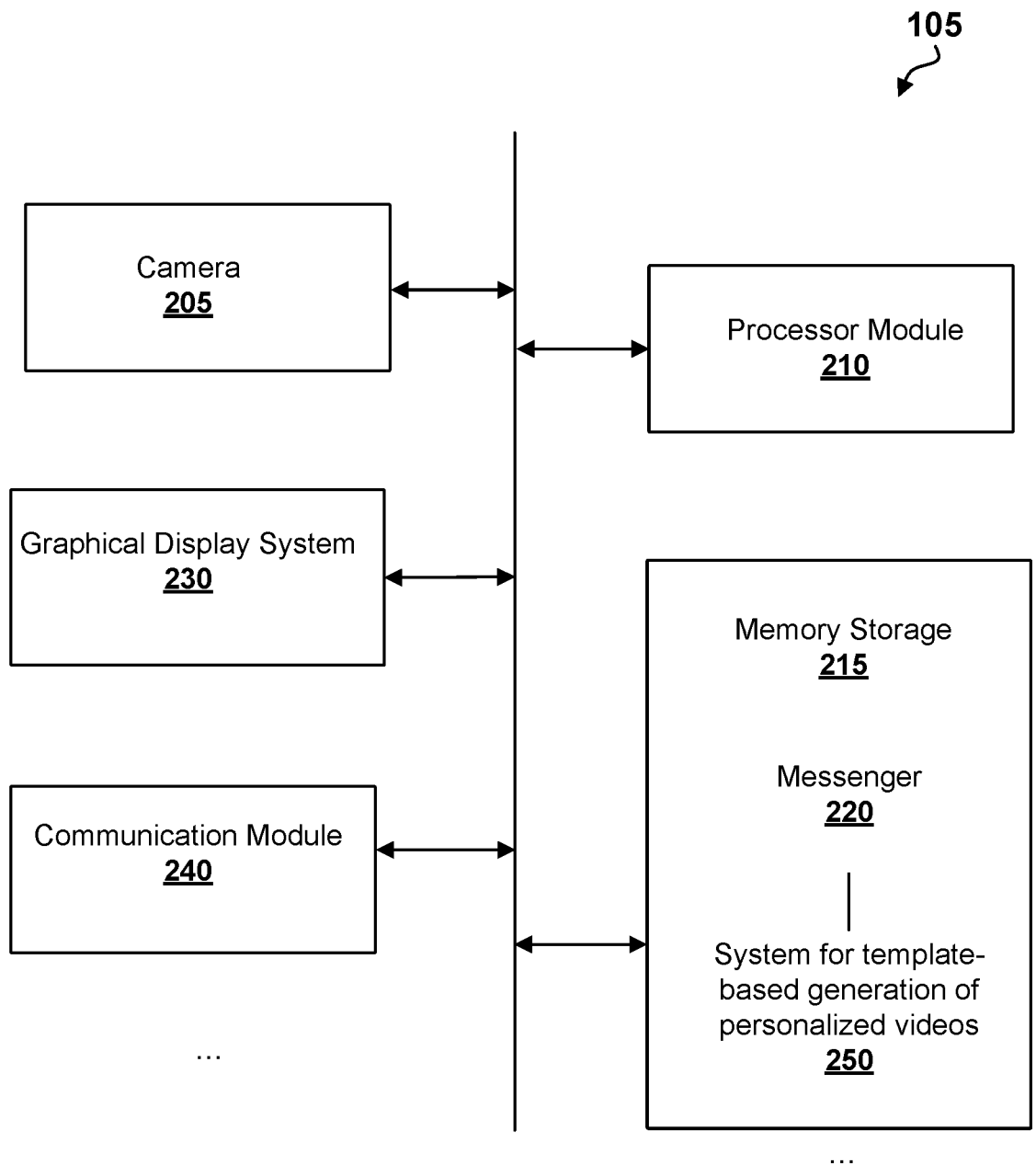
FIG. 2 is a block diagram showing an example embodiment of a computing device for implementing methods for providing personalized videos.

FIG. 2 is a block diagram showing an example embodiment of a computing device 105 (or computing device 110) for implementing methods for personalized videos. In the example shown in FIG. 2, the computing device 110 includes both hardware components and software components. Particularly, the computing device 110 includes the camera 205 or any other image-capturing device or scanner to acquire digital images. The computing device 110 can further include a processor module 210 and a storage module 215 for storing software components and processor-readable (machine-readable) instructions or codes, which when performed by the processor module 210, cause the computing device 105 to perform at least some steps of methods for providing personalized videos as described herein. The computing device 105 may include graphical display system 230 and a communication module 240. In other embodiments, the computing device 105 may include additional or different components. Moreover, the computing device 105 can include fewer components that perform functions similar or equivalent to those depicted in FIG. 2.

The computing device 110 can further include a messenger 220 for enabling communication chats with another computing device (such as the computing device 110) and a system 250 for providing personalized videos. The system 300 is described in more detail below with reference to FIG. 3. The messenger 220 and the system 300 may be implemented as software components and processor-readable (machine-readable) instructions or codes stored in the memory storage 215, which when performed by the processor module 210, cause the computing device 105 to perform at least some steps of methods for providing communication chats and personalized videos as described herein.

In some embodiments, the system 300 for providing personalized videos can be integrated in the messenger 220. A user interface of the messenger 220 and the system 300 for providing the personalized videos can be provided via the graphical display system 230. The communication chats can be enabled via the communication module 240 and the network 120. The communication module 240 may include a GSM module, a WiFi module, a Bluetooth™ module and so forth.

Figure 3:
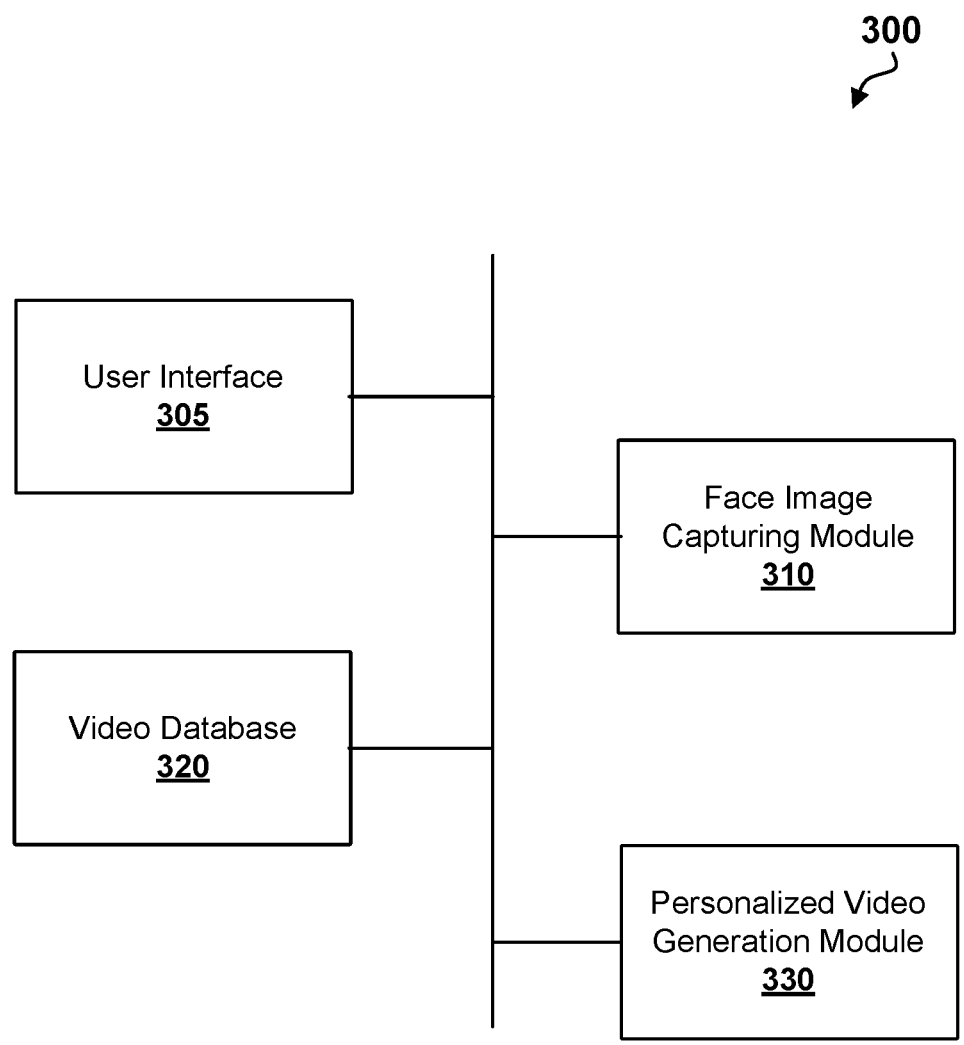
FIG. 3 is a block diagram showing a system for providing personalized videos, according to some example embodiment of the disclosure.

FIG. 3 is a block diagram of a system 300 for providing personalized videos, according to some example embodiment of the disclosure. The system 300 may include a user interface 305, a face image capturing module 310, a video database 320, and a personalized video generation module 330.

The video database 320 may store one or more videos. The videos can include previously recorded videos featuring an actor or multiple actors. The videos may include two-dimensional (2D) videos or three-dimensional (3D) scenes. The videos can be pre-processed to segment the actor's face (also referred to as a target face) and background in each frame and to identify a set of parameters that can be used for further insertion of a source face instead of the face of the actor (the target face). The set of parameters can include a face texture, facial expression parameters, face color, facial identity parameters, position and angle of the face, and so forth. The set of parameters may also include a list of manipulations and operations that can be carried out on the actor's face such as the replacement of the actor's face performed in a photo-realistic manner.

The face image capturing module 310 can receive an image of a person and generate an image of the face of the person. The image of the face of the person can be used as a source face to replace a target face in the videos stored in the video database 320. The image of the person can be captured by the camera 205 of the computing device 105. The image of the person can include an image stored in the memory storage 215 of the computing device 105. Details for the face image capturing module 320 are provided in FIG. 7.

The personalized video generation module 330 can generate, based on an image of the source face, a personalized video from one or more pre-generated videos stored in database 320. The module 330 may replace the face of the actor in a pre-generated video with the source face while keeping the facial expression of the face of the actor. The module 330 may replace a face texture, face color, and facial identity of the actor with a face texture, face color, and facial identity of the source face. The module 330 may also add an image of glasses over an eye region of the source face in the personalized video. Similarly, the module 330 may add an image of a headwear (for example, a cap, a hat, a helmet, and so forth) over the head of the source face in the personalized video. The image(s) of the glasses and headwear can be pre-stored in the computing device 105 of the user or generated. The images of the glasses and headwear can be generated using a DNN. The module 330 may also apply a shade or a color to the source face of the personalized video. For example, the module 330 may add a suntan to the face of the source face.

Figure 4:
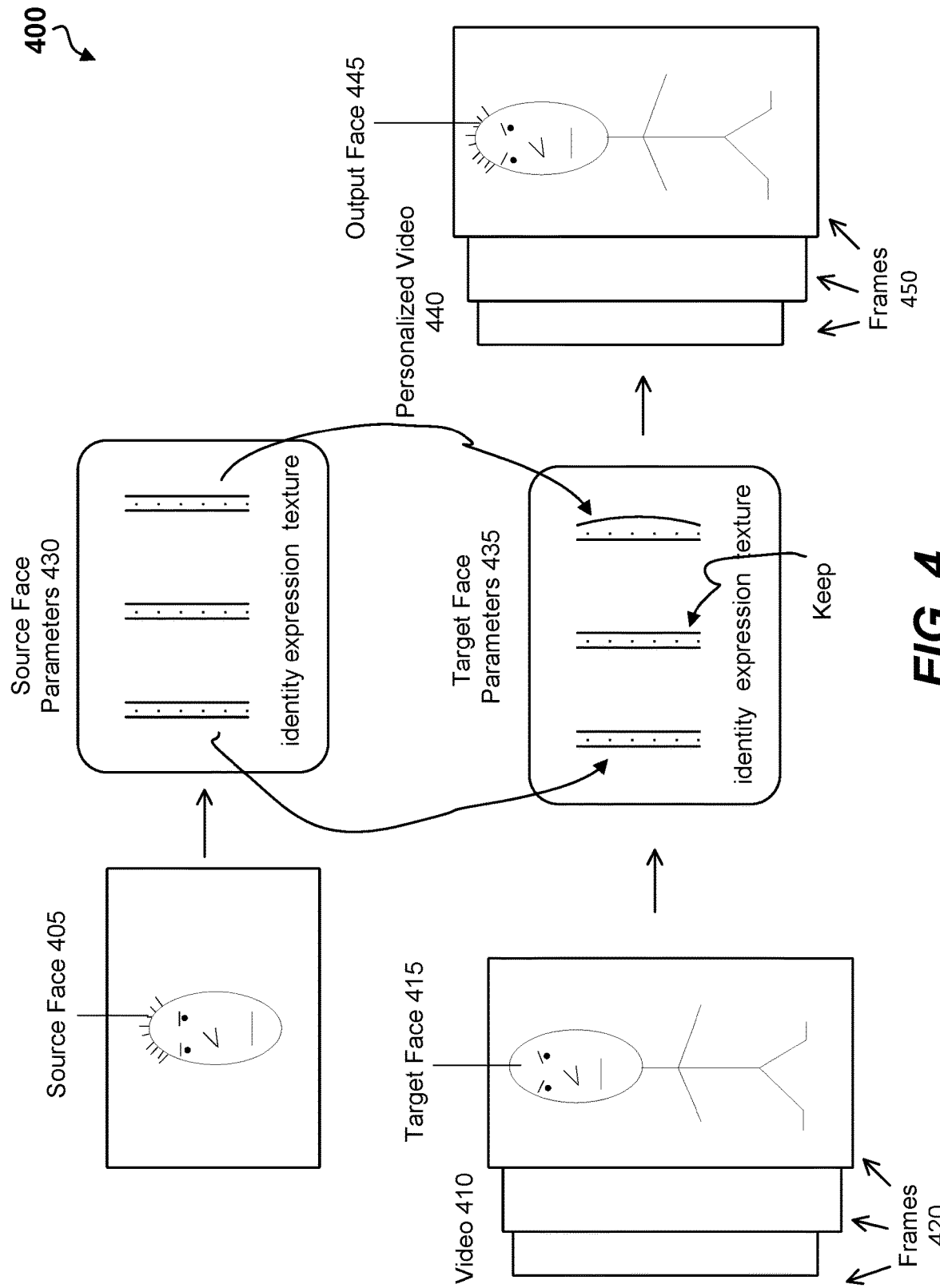
FIG. 4 is a schematic showing a process of generation of a personalized video, according to an example embodiment.

FIG. 4 is a schematic showing functionality 400 of the personalized video generation module 330, according to some example embodiments. The personalized video generation module 330 may receive an image of a source face 405 and a pre-generated video 410. The pre-generated video 410 may include one or more frames 420. The frames 420 may include a target face 415. The facial expression of the source face 405 can be different from the facial expression of target face 415.

In some embodiments of the disclosure, the personalized video generation module 330 can be configured to analyze the image of the source face 405 to extract source face parameters 430. The source face parameters 430 can be extracted by fitting a parametric face model to the image of the source face 405. The parametric face model may include a template mesh. Coordinates of vertices in the template mesh may depend on two parameters: a facial identity and a facial expression. Thus, the source parameters 430 may include a facial identity and facial expression corresponding to the source face 405. The source parameters 405 may further include a texture of the source face 405. The texture may include colors at vertices in the template mesh. In some embodiments, a texture model associated with the template mesh can be used to determine the texture of the source face 405.

In some embodiments of the disclosure, the personalized video generation module 330 can be configured to analyze the frames 420 of the target video 410 to extract target face parameters 435 for each of the frames 420. The target face parameters 435 can be extracted by fitting the parametric face model to the target face 415. The target parameters 435 may include facial identity and facial expression corresponding to the target face 415. The target face parameters 435 may further include texture of the target face 415. The texture of the target face 415 can be obtained using the texture model. In some embodiments of the present disclosure, each of the frames 420 may include metadata. The metadata may include the target face parameters determined for the frame. For example, the target face parameters can be determined by the messenger services system 130 (shown in FIG. 1). The target face parameters can be stored in metadata of the frames of the pre-generated video 410. The pre-generated video 410 can be further downloaded to the computing device 105 and stored in video database 320. Alternatively, the personalized video generation module 330 can pre-process the pre-generated video 410 to determine the target face parameters 435 and location parameters of the target face 415 in the frames 420. The personalized video generation module 330 may further store the target face parameters 435 and location parameters of the target face 415 in the metadata of the corresponding frames 420. This way, the target face parameters 435 are not recomputed each time the pre-generated video 410 is selected for personalization with different source faces.

In some embodiments of the disclosure, the personalized video generation module 330 can be further configured to replace the facial expression in source face parameters 430 with the facial expression from the target face parameters 435. The personalized video generation module 330 can be further configured to synthesize an output face 445 using the parametric face model, texture module, and target face parameters 435 with the replaced facial expression. The output face 445 can be used to replace the target face 415 in frame of the target video 410 to obtain frames 450 of an output video shown as personalized video 440. The output face 445 is the source face 405 adopting the facial expression of the target face 415. The output video is the personalized video 440 generated based on the pre-determined video 410 and the image of the source face 405.

Figure 5:
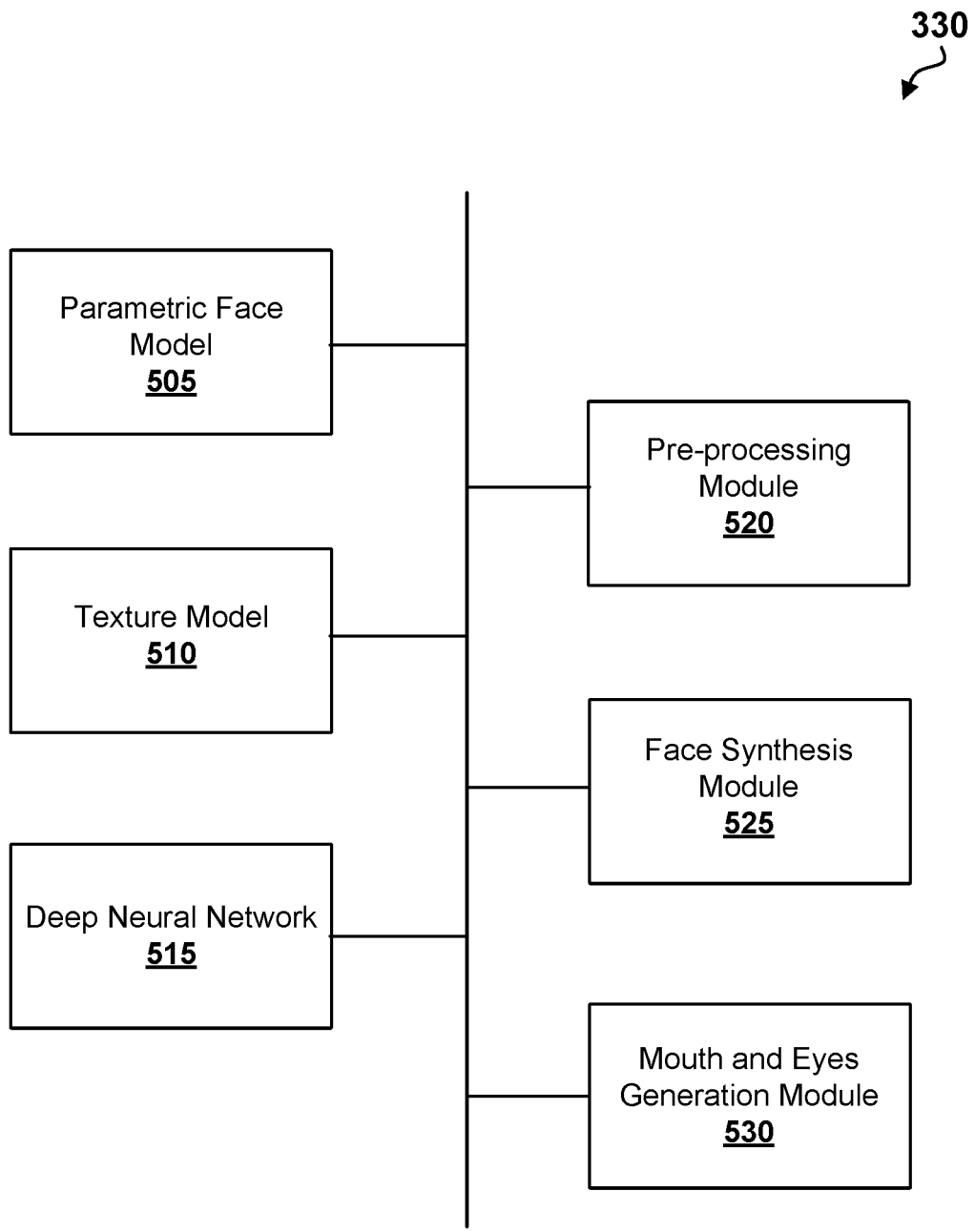
FIG. 5 is a block diagram of a personalized video generation module, according to some example embodiments of the disclosure.

FIG. 5 is a block diagram of the personalized video generation module 330, according to one example embodiment. The personalized video generation module 330 can include a parametric face model 505, a texture model 510, a DNN 515, a pre-processing module 520, a face synthesis module 525, and a mouth and eyes generation module 530. The modules 505-530 can be implemented as software components for use with hardware devices such as computing device 105, the computing device 110, the messenger services system 130, and the like.

In some embodiments of the disclosure, the parametric face model 505 can be pre-generated based on images of a pre-defined number of individuals of different ages, genders, and ethnic backgrounds. For each individual, the images may include an image of the individual having a neutral facial expression and one or more images of the individual having different facial expressions. The facial expression may include open mouth, smile, anger, astonishment, and so forth.

The parametric face model 505 may include a template mesh with a pre-determined number of vertices. The template mesh may be represented as a 3D triangulation defining a shape of a head. Each individual can be associated with an individual-specific blend shape. The individual-specific blend shape can be adjusted to the template mesh. The individual-specific blend shape can correspond to specific coordinates of vertices in the template mesh. Thus, different images of individuals can correspond to the template mesh of the same structure; however, coordinates of vertices in the template mesh are different for the different images.

In some embodiments of the disclosure, the parametric face model may include a bilinear face model depending on two parameters: facial identity and facial expression. The bilinear face model can be built based on blend shapes corresponding to the images of individuals. Thus, the parametric face model includes the template mesh of a pre-determined structure, wherein the coordinates of vertices depend on the facial identity and facial expression.

In some embodiments of the disclosure, the texture model 510 can include a linear space of texture vectors corresponding to images of the individuals. The texture vectors can be determined as colors at vertices of the template mesh.

The parametric face model 505 and the texture model 510 can be used to synthesize a face based on known parameters of facial identity, facial expression, and texture. The parametric face model 505 and the texture model 510 can be also used to determine unknown parameters of facial identity, facial expression, and texture based on a new image of a new face.

Synthesis of a face using the parametric face model 505 and the texture model 510 is not time-consuming; however, the synthesized face may not be photorealistic, especially in the mouth and eyes regions. In some embodiments of the disclosure, the DNN 515 can be trained to generate photorealistic images of the mouth and eye regions of a face. The DNN 515 can be trained using a collection of videos of talking individuals. The mouth and eyes regions of talking individuals can be captured from frames of the videos. The DNN 515 can be trained using a generative adversarial network (GAN) to predict the mouth and eyes regions of the face based on a pre-determined number of previous frames of the mouth and eyes regions and desired facial expression of a current frame. The previous frames of the mouth and eyes regions can be extracted at specific moment parameters for facial expression. The DNN 515 may allow synthesizing mouth and eyes regions with desired parameters for facial expression. The DNN 515 may also allow utilizing previous frames to obtain spatial coherence.

The GAN performs the conditioning on mouth and eyes regions rendered from a face model, current expression parameters, and embedding features from previously generated images and produces the same but more photorealistic regions. The mouth and eyes regions generated using the DNN 515 can be used to replace the mouth and eye regions synthesized by the parametric face model 505. It should be noted that synthesizing mouth and eye regions by DNN may be less time-consuming than synthesizing an entire face by a DNN. Therefore, generation of mouth and eye regions using DNN can be carried out in real time, by, for example, one or more of processors of a mobile device, such as a smartphone or a tablet.

In some embodiments, the pre-processing module 520 can be configured to receive a pre-generated video 410 and an image of a source face 405. The target video 410 may include a target face. The pre-processing module 520 can be further configured to perform a segmentation of at least one frame of the target video to obtain images of the target face 415 and a target background. The segmentation can be carried out using neural networks, matting, and smoothing.

In some embodiments, the pre-processing module 520 can be further configured to determine, using the parametric face model 505 and the texture model 510, a set of target face parameters based on at least one frame of the target video 410. In some embodiments, the target parameters may include target facial identity, target facial expression, and target texture. In some embodiments, the pre-processing module 520 may be further configured to determine, using the parametric face model 505 and the texture model 510, a set of source face parameters based on the image of the source face 405. The set of source face parameters may include source facial identity, source facial expression, and source texture.

In some embodiments, the face synthesis module 525 can be configured to replace the source facial expression in the set of source face parameters with the target facial expression to obtain a set of output parameters. The face synthesis module 525 can be further configured to synthesize an output face using the output set of parameters and the parametric face model 505 and texture model 510.

In some embodiments, 2D deformations can be applied to the target face to obtain photorealistic images of regions of the output face which are hidden in the target face. The parameters of the 2D deformations can be determined based on the source set of parameters of the parametric face model.

In some embodiments, the mouth and eyes generation module 530 can be configured to generate mouth and eyes regions using DNN 515 based on the source facial expression and at least one previous frame of the target video 410. The mouth and eye generation module 530 can be further configured to replace mouth and eyes regions in an output face synthesized with the parametric face model 505 and texture model 510 with mouth and eye regions synthesized with DNN 515.

Figure 6:
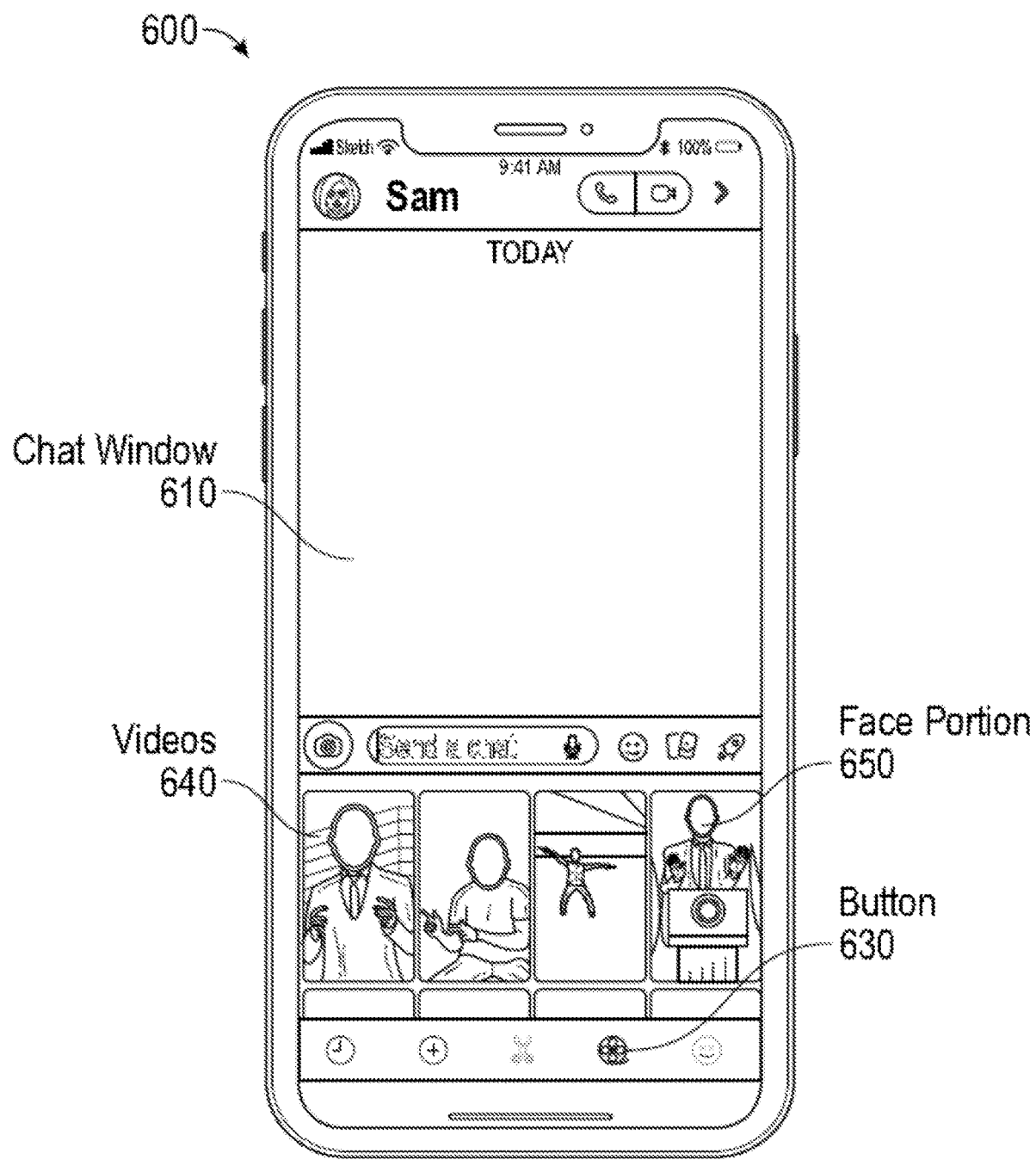

FIG. 6 shows an example screen of a user interface 600 of a system for providing personalized videos in a messaging application (messenger), according to some example embodiments. The user interface 600 may include a chat window 610 and a section containing videos 640. The videos 640 may include pre-rendered videos with face portions 650 instead of faces. The pre-rendered videos may include teaser videos intended to show the user a sample representation of how the personalized video may look. The face portions 650 may be shown in the form of white ovals. In some embodiments, the videos 640 may include several face portions 650 to enable creation of multiple-person videos (i.e., videos having faces of multiple persons). A user may tap on any of the videos 640 to select one of the videos 640 for modifying and sending to the chat window 610. The modification may include receiving a selfie picture from the user (i.e., an image of a user face taken via a front camera of the computing device), obtaining a source face from the selfie picture, and modifying the selected video 640 by using the source face to create a personalized video, also referred herein to as a "Reel". Thus, as used herein, the Reel is a personalized video produced by modifying a video template (a video without a user face) into a video with the user face inserted. Therefore, the personalized video may be generated in the form of an audiovisual media (e.g., a video, an animation, or any other type of media) that features a face of a user. The modified video can be sent to the chat window 610. The user interface 600 may further have a button 630 which, upon tapping, may transition the user transitioned from the messaging application to the system for providing personalized videos according to the present disclosure.

Figure 7:
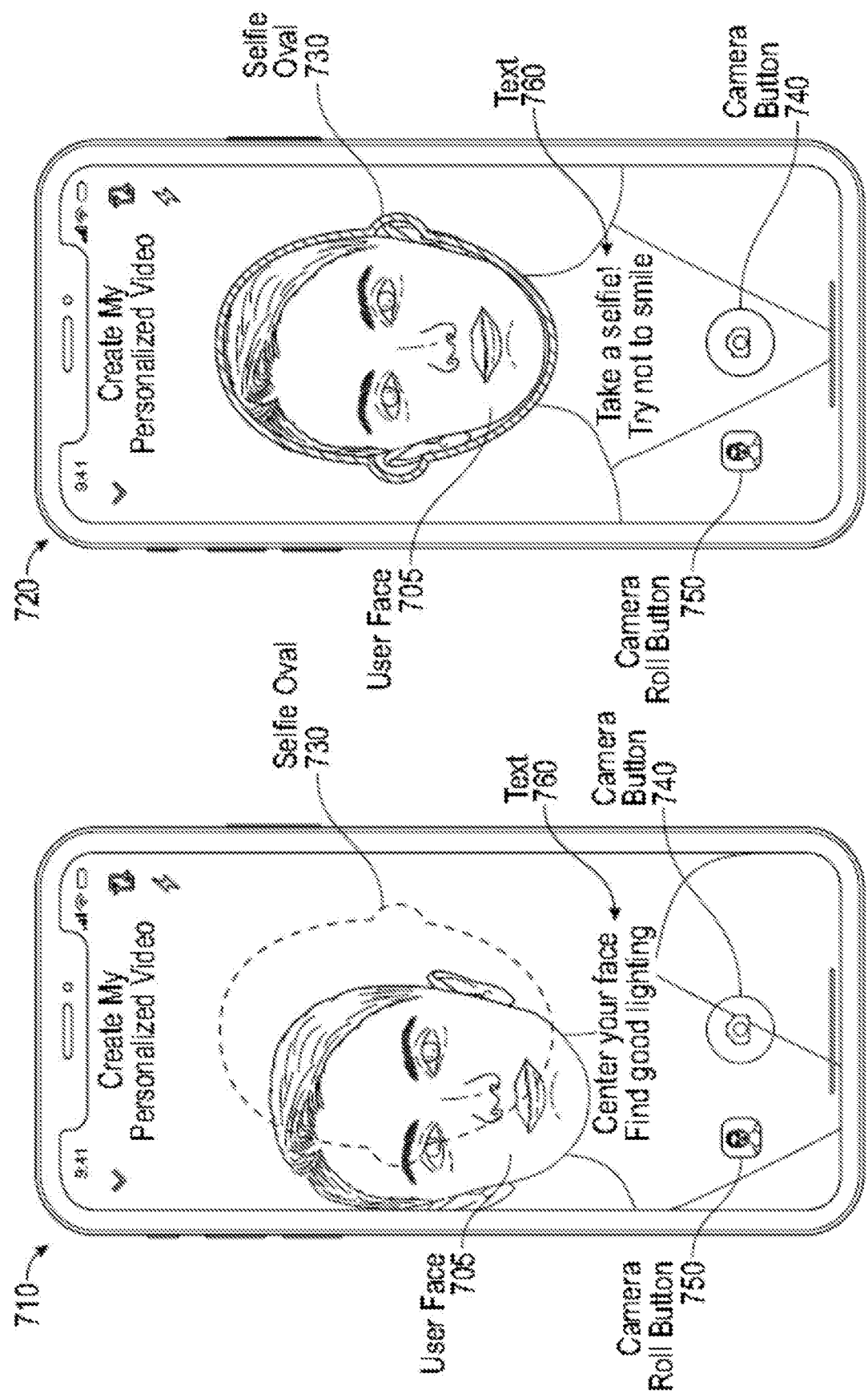

FIG. 7 shows an example screen of user interfaces 710 and 720 of a system for providing personalized videos in a messenger, according to some example embodiments. The user interfaces 710 and 720 show a selfie capturing mode in which a user may take an image of the user face, which is then used as a source face. The user interface 710 shows a live view of a camera of a computing device when the user intends to capture the selfie image. The live view may show a user face 705. The user interface 710 may show a selfie oval 730 and a camera button 740. In an example embodiment, the camera button 740 may slide up from a bottom of the screen in the selfie capturing mode. The user may need to change the position of the camera in order to position the user face 705 within the boundaries of the selfie oval 730. When the user face 705 is not centered in the selfie oval 730, the selfie oval 730 can be styled in the form of a dotted line and the camera button 740 is semi-transparent and not actionable to indicate that the camera button 740 is inactive. To notify the user that the user face is not centered, a text 760 may be displayed below the selfie oval 730. The text 760 may include instructions for the user, e.g., "Center your face," "Find good lighting," and so forth.

The user interface 720 shows a live view of the camera of the computing device after the user changes the position of the camera to capture the selfie image and the user face 705 becomes centered in the selfie oval 730. In particular, when the user face 705 becomes centered in the selfie oval 730, the selfie oval 730 changes to become a bold continuous line and the camera button 740 becomes opaque and actionable to indicate that the camera button 740 is now active. To notify the user, the text 760 may be displayed below the selfie oval 730. The text 760 may instruct the user to make the selfie picture, e.g., "Take a selfie," "Try not to smile," and so forth. In some embodiments, the user may select an existing selfie picture from a picture gallery by pressing a camera roll button 750.

FIG. 8 shows an example screen of user interfaces 810 and 820 of a system for providing personalized videos in a messenger, according to some example embodiments. The user interfaces 810 and 820 are shown on the screen after the user takes a selfie picture. The user interface 810 may show a background 800, a schematic representation 805 of a Reel that is currently being created, and a text 815. The text 815 may include, e.g., "Creating My Reel." The user interface 820 may show a Reel 825 that was created and text portions 830 and 835. The Reel 825 may be shown in a full screen mode. The text 830 may include, e.g., "Your Reel is ready." A dark color gradient may be provided behind the Reel 825 so the text 830 is visible. The text portion 835 may display, for example, "Use this selfie to send Reels in Chat or retake it to try again" to notify the user that the user may either use the selfie picture already taken by the user or take another selfie picture. Additionally, two buttons may be shown on the user interface 820. A button 840 may be shown with a blue and filled background and may instruct the user to "Use this Selfie." When the user taps the button 840, a two-person Reels screen may be enabled. A button 845 may be shown with a white, outlined, and transparent background and may instruct the user to "Retake Selfie." When the user taps the button 845, the user interface 710 shown on FIG. 7 may be activated and the step of creation of a Reel may be initiated as described with reference to FIG. 7. The user interface 820 may further show a subtext 850 below the buttons 840 and 845. The subtext 850 may inform how the user may delete Reel, e.g., "You can delete your Reels selfie in Settings."

Figure 9:
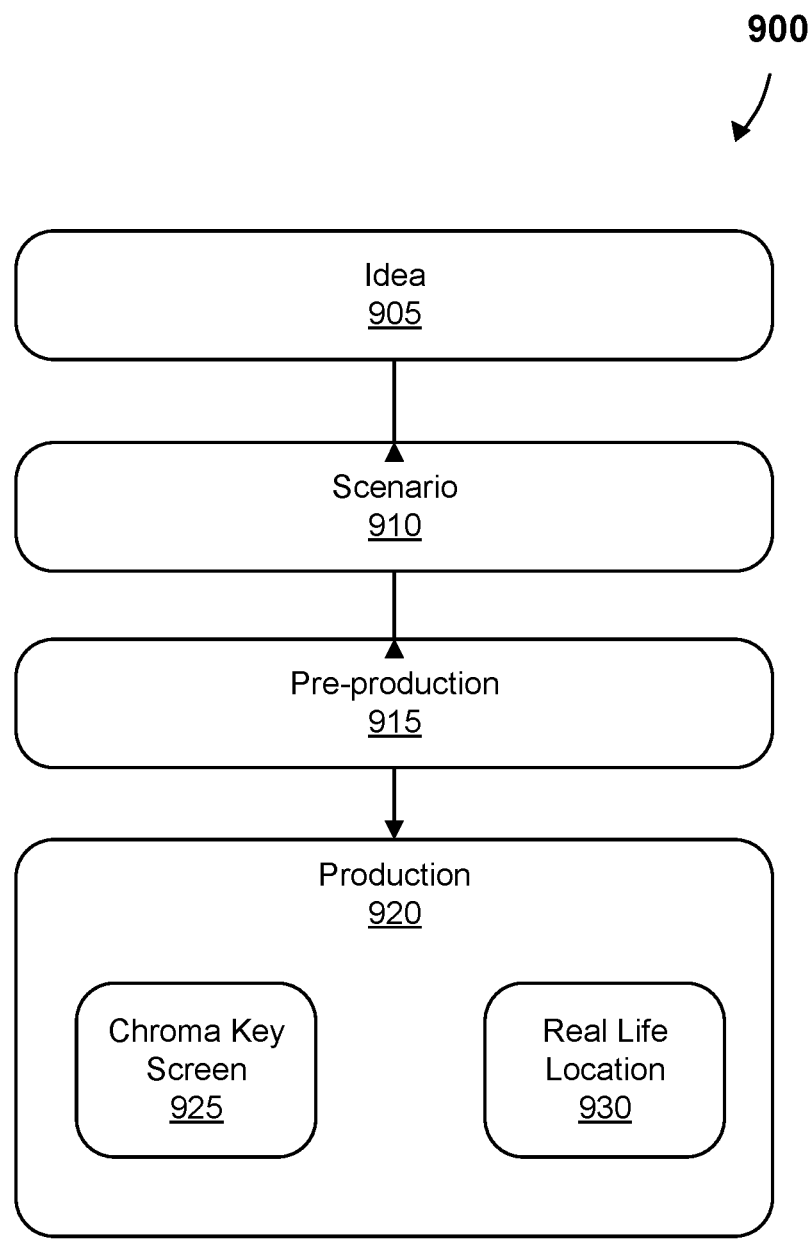
FIG. 9 is a flow chart showing a process of generation of live action videos for use in the generation of video templates, according to some example embodiments.

FIG. 9 is a block diagram showing a process 900 of generating live action videos. The live action videos can be further used to generate video templates for generation of personalized video. The process 900 may include generating an idea at step 905 and creating a scenario at step 910. The process 900 may continue with pre-production at step 915, which is followed by production 920. The production 920 may include recording using a chroma key screen 925 or at a real life location 930.

Figure 10:
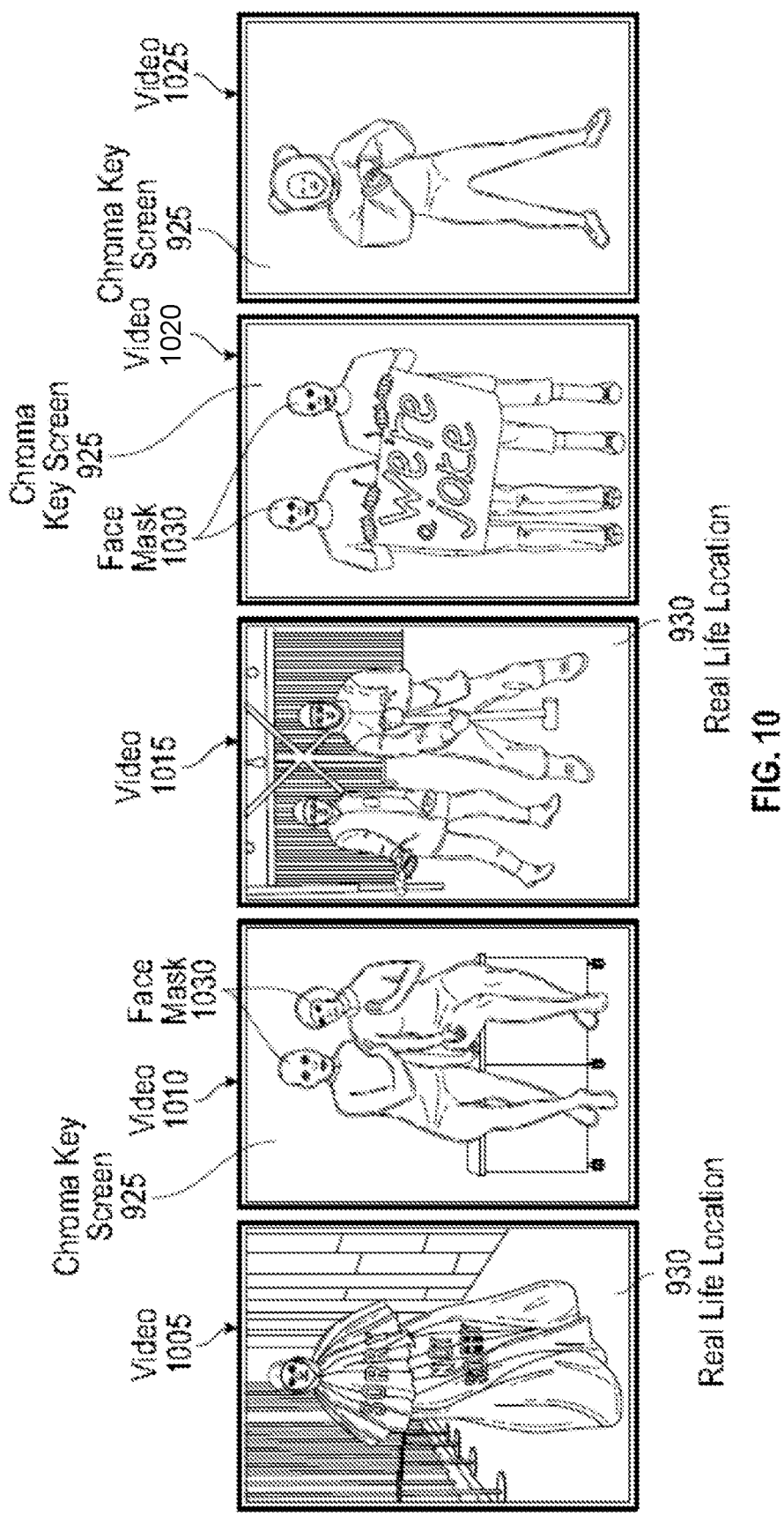
FIG. 10 shows frames of example live action videos for generating video templates, according to some example embodiments.

FIG. 10 shows frames of example live action videos for generating video templates. Frames for video 1005 and video 1015 are recorded at a real life location 930. Frames for video 1010, video 1020, and video 1025 are recorded using a chroma key screen 925. The actors may wear chroma key face masks 1030 with tracking marks that cover the face of the actors.

Figure 11:
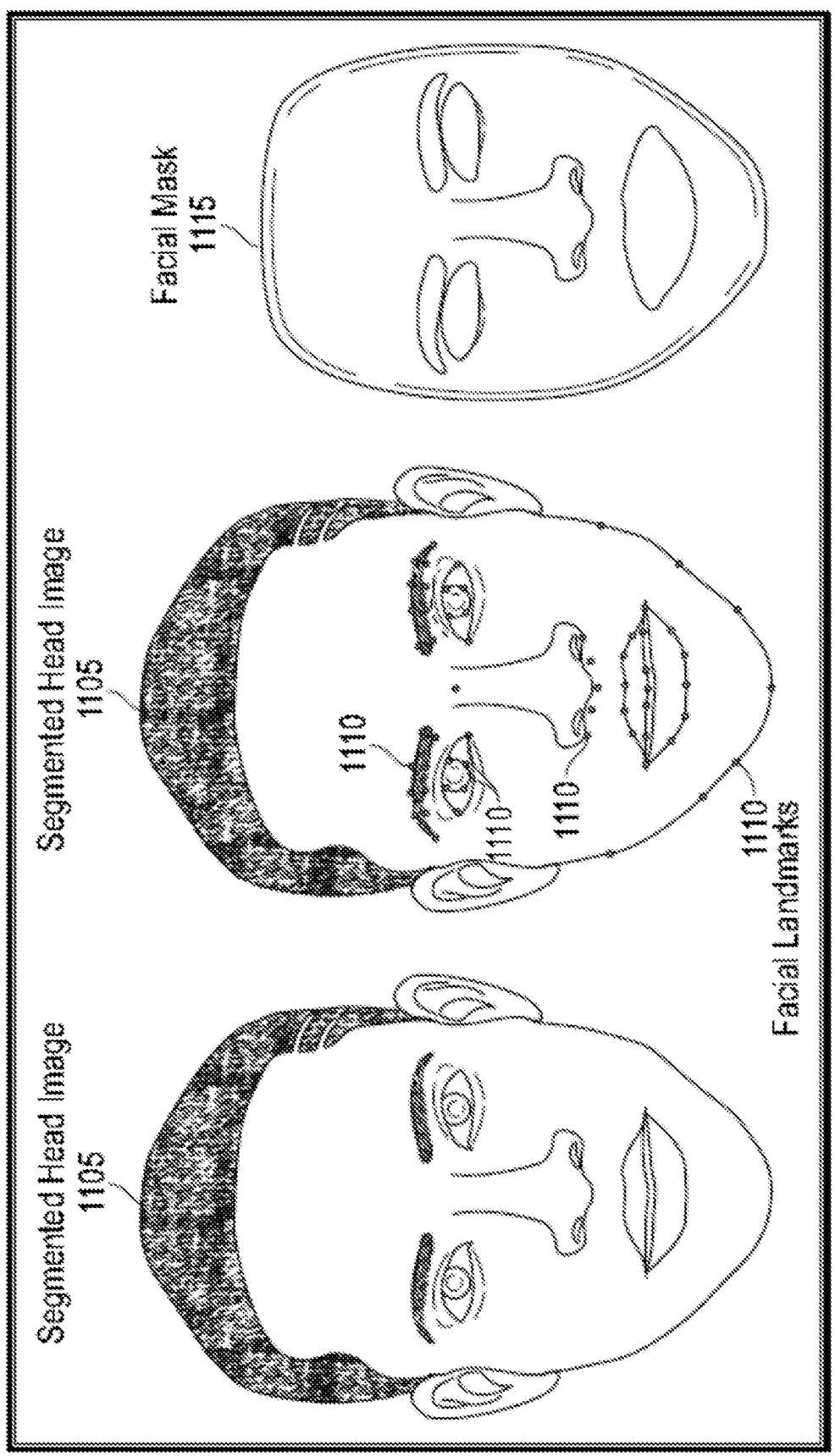
FIG. 11 shows a segmented head image, the head image with facial landmarks, and a facial mask, according to an example embodiment.

FIG. 11 shows a segmented head image 1105, the segmented head image 1105 with facial landmarks 1110, and a facial mask 1115, according to an example embodiment. Based on segmentation of the head image of the user and facial landmarks, the facial mask 1115 of the user may be created. Regions such as eyes, mouth, hair, or accessories (like glasses) may be not included in the facial mask 1115. The segmented head image 1105 of the user and the facial mask may be used to compute the statistics for facial skin of the user. Thus, the input of the facial statistics computation may include the segmented head image 1105 of the user, facial landmarks 1110, and facial segmentation, and the output of the facial statistics computation may include color statistics for the facial skin of the user.

Figure 12:
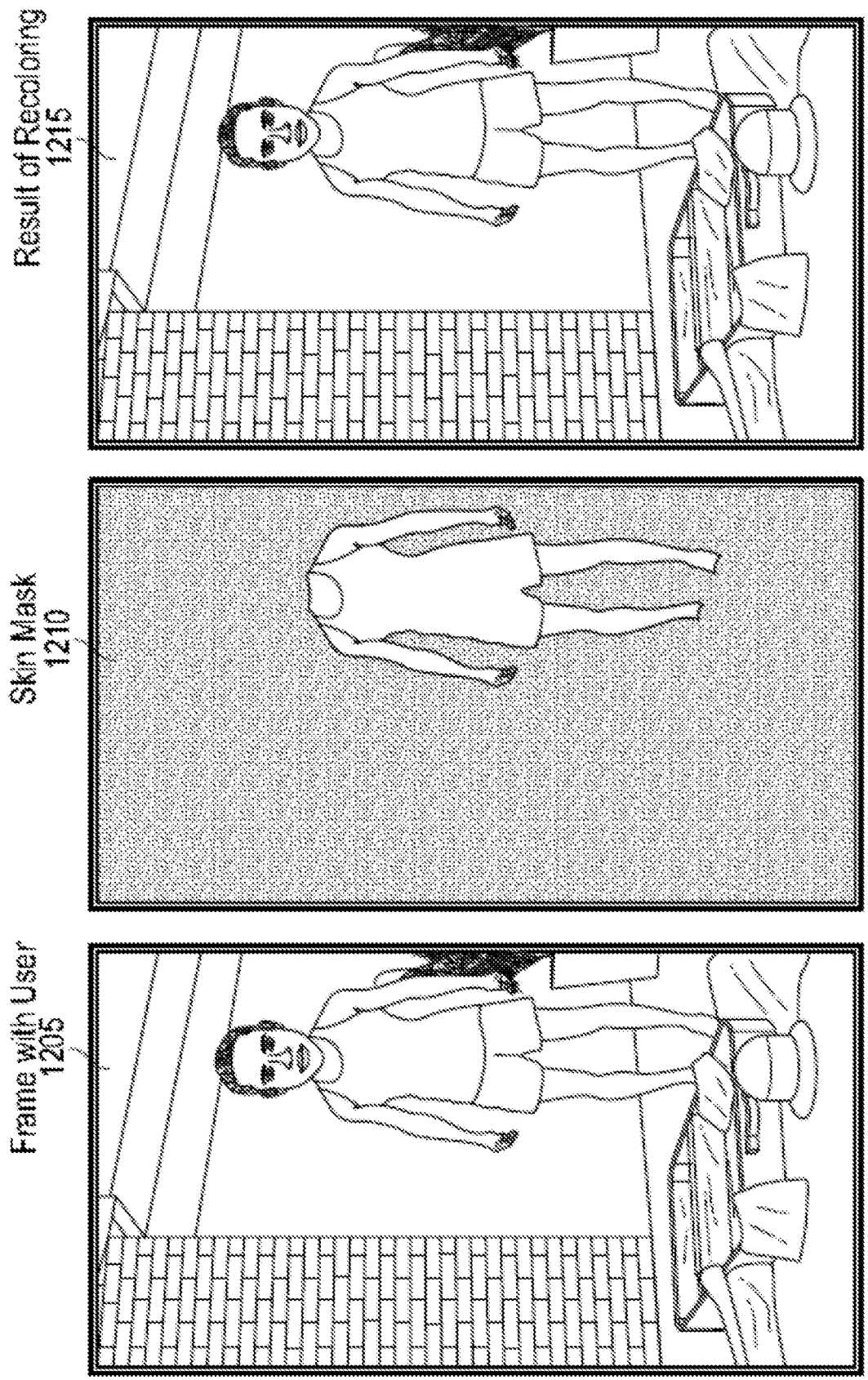
FIG. 12 shows a frame featuring a user face, a skin mask, and a result of recoloring the skin mask, according to an example embodiment.

FIG. 12 shows a frame 1205 featuring a user face, a skin mask 1210, and a result 1215 of recoloring the skin mask 1210, according to an example embodiment. The skin-tone matching and recoloring may be performed using statistics that describe color distributions in the actor's skin and user's skin, and recoloring of a background frame may be performed in real-time on a computing device. For each color channel, distribution matching may be performed and values of background pixels may be modified in order to make the distribution of transformed values close to the distribution of facial values. Distribution matching may be performed either under assumption that color distribution is normal or by applying techniques like multidimensional probability density function transfer. Thus, the input of the skin-tone matching and recoloring process may include a background frame, actor skin masks for the frame, actor body skin color statistics for each mask, and user facial skin color statistics, and the output may include the background frame with all body parts with uncovered skin recolored.

Figure 13:
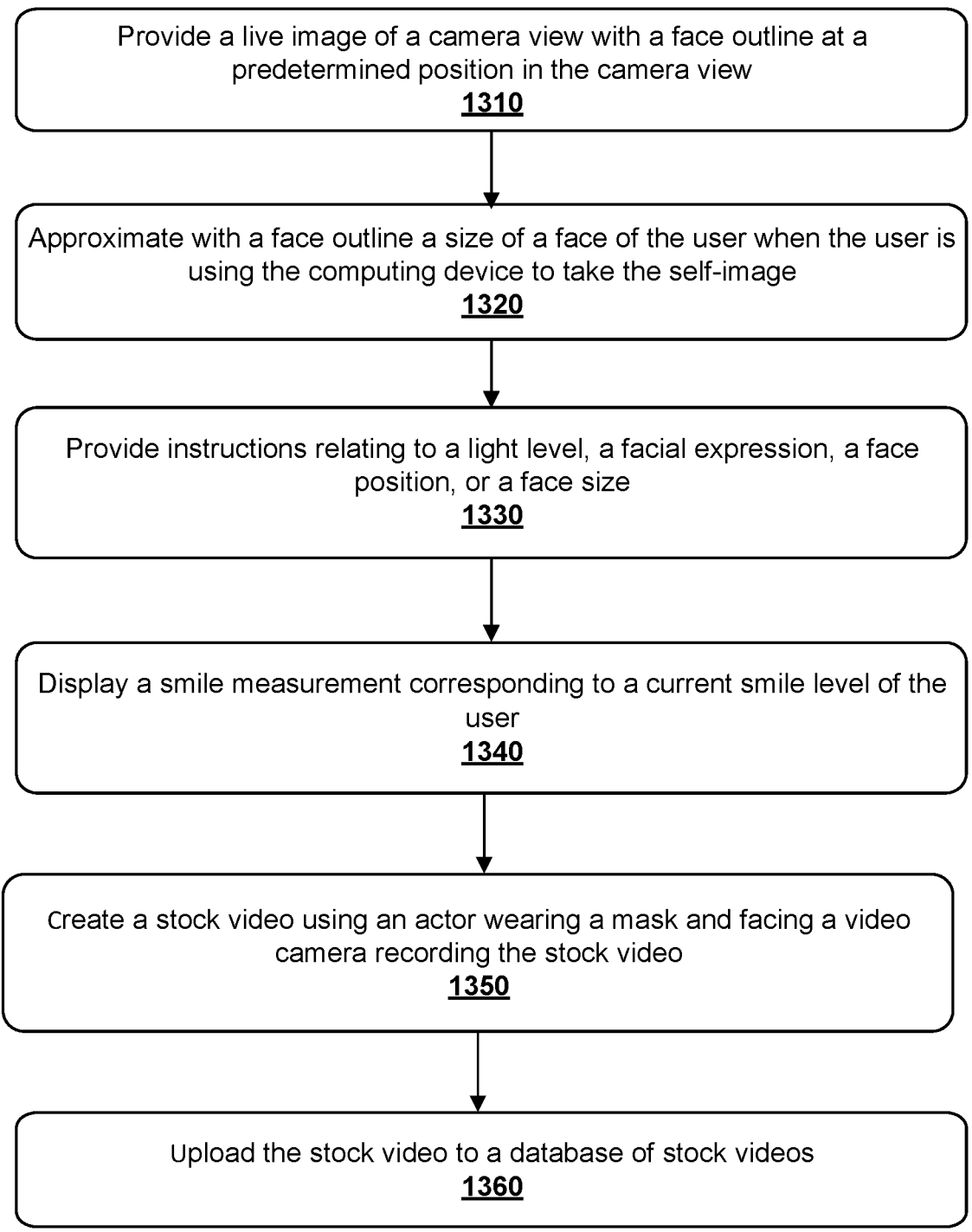
FIG. 13 is a flow chart showing a method for preparing stock videos and setting up self-images for combining with the stock videos to create a personalized video, in accordance with an example embodiment.

FIG. 13 is a flow chart showing a method 1300 for operating a messaging system adapted to send and receive modifiable videos including a self-image of a user. The flow in method 1300 starts at operation 1310, which indicates to provide a live image of a camera view with a face outline at a predetermined position in the camera view. From operation 1310, the flow proceeds to operation 1320, which indicates to approximate, with a face outline, a size of a face of the user when the user is using the computing device to take the self-image. From operation 1320, the flow proceeds to operation 1330, which indicates to provide instructions relating to a light level, a facial expression, a face position, or a face size. From operation 1330, the flow proceeds to operation 1340, which indicates to display a smile measurement corresponding to a current smile level of the user. The smile measurement is displayed relative to a target smile level to enable the user to adjust the current smile level to the target smile level. From operation 1340, the flow proceeds to operation 1350, which indicates to create a stock video using an actor wearing a mask and facing a video camera recording the stock video. The mask is a marker for insertion of the self-image. From operation 1350, the flow proceeds to operation 1360, which indicates to upload the stock video to a database of stock videos, which is accessible by a user to select for combination with the self-image to form a personalized video. Some of the steps in method 1300 may be optional, and may be performed in various orders.

Figure 14:
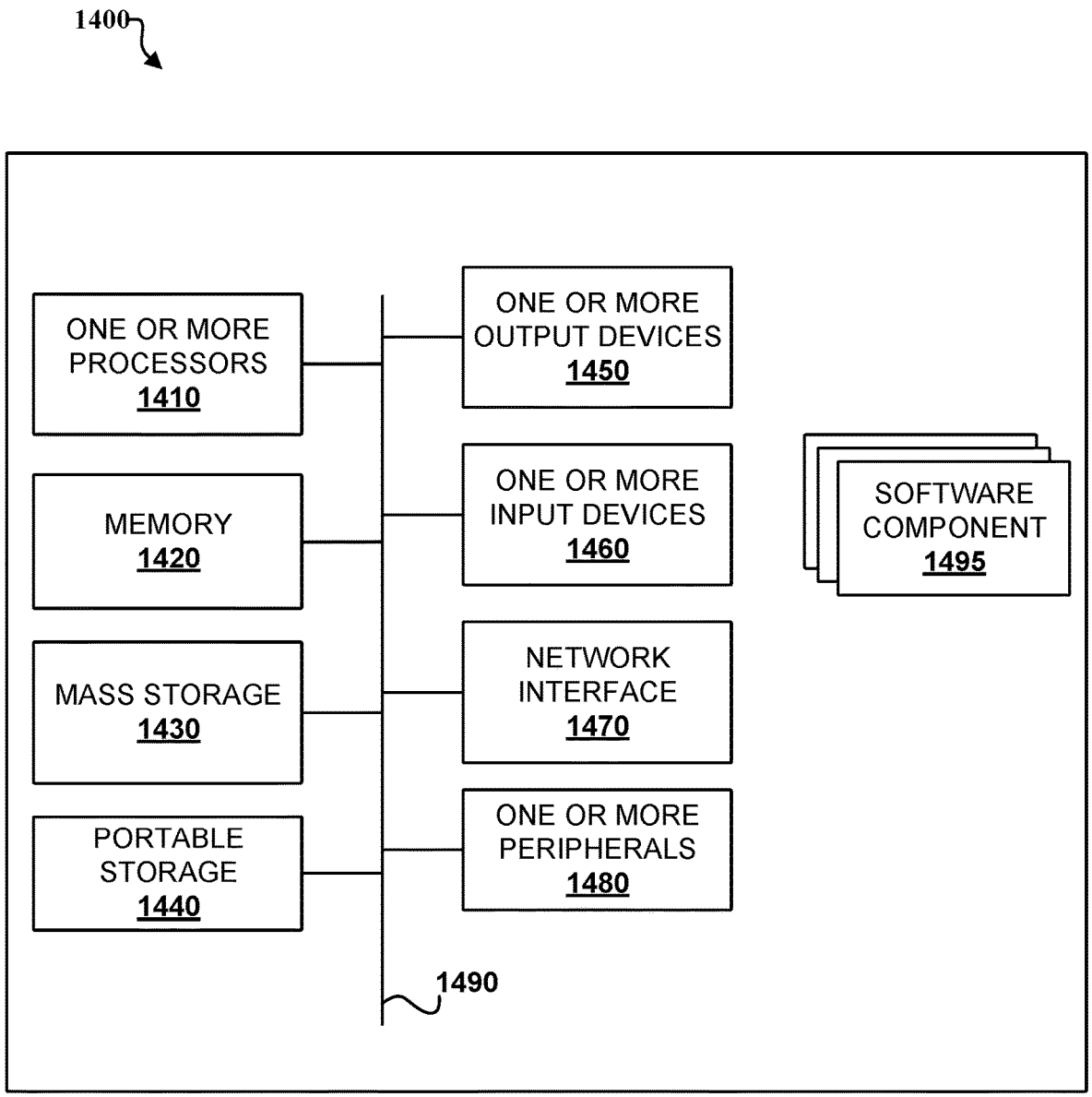
FIG. 14 shows an example computer system that can be used to implement methods for providing personalized videos.

FIG. 14 illustrates an example computing system 1400 that can be used to implement methods described herein. The computing system 1400 can be implemented in the contexts of the likes of computing devices 105 and 110, the messenger services system 130, the messenger 220, and the system 300 for providing personalized videos.

As shown in FIG. 14, the hardware components of the computing system 1400 may include one or more processors 1410 and memory 1420. Memory 1420 stores, in part, instructions and data for execution by processor 1410. Memory 1420 can store the executable code when the system 1400 is in operation. The system 1400 may further include an optional mass storage device 1430, optional portable storage medium drive(s) 1440, one or more optional output devices 1450, one or more optional input devices 1460, an optional network interface 1470, and one or more optional peripheral devices 1480. The computing system 1400 can also include one or more software components 1495 (e.g., ones that can implement the method for providing personalized videos as described herein).

The components shown in FIG. 14 are depicted as being connected via a single bus 1490. The components may be connected through one or more data transport means or data network. The processor 1410 and memory 1420 may be connected via a local microprocessor bus, and the mass storage device 1430, peripheral device(s) 1480, portable storage device 1440, and network interface 1470 may be connected via one or more input/output (I/O) buses.

The mass storage device 1430, which may be implemented with a magnetic disk drive, solid-state disk drive, or an optical disk drive, is a non-volatile storage device for storing data and instructions for use by the processor 1410. Mass storage device 1430 can store the system software (e.g., software components 1495) for implementing embodiments described herein.

Portable storage medium drive(s) 1440 operates in conjunction with a portable non-volatile storage medium, such as a compact disk (CD), or digital video disc (DVD), to input and output data and code to and from the computing system 1400. The system software (e.g., software components 1495) for implementing embodiments described herein may be stored on such a portable medium and input to the computing system 1400 via the portable storage medium drive(s) 1440.

The optional input devices 1460 provide a portion of a user interface. The input devices 1460 may include an alphanumeric keypad, such as a keyboard, for inputting alphanumeric and other information, or a pointing device, such as a mouse, a trackball, a stylus, or cursor direction keys. The input devices 1460 can also include a camera or scanner. Additionally, the system 1400 as shown in FIG. 14 includes optional output devices 1450. Suitable output devices include speakers, printers, network interfaces, and monitors.

The network interface 1470 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 1470 may be a network interface card, such as an Ethernet card, optical transceiver, radio frequency transceiver, or any other type of device that can send and receive information. The optional peripherals 1480 may include any type of computer support device to add additional functionality to the computer system.

The components contained in the computing system 1400 are intended to represent a broad category of computer components. Thus, the computing system 1400 can be a server, personal computer, hand-held computing device, telephone, mobile computing device, workstation, minicomputer, mainframe computer, network node, or any other computing device. The computing system 1400 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for self-image formation and stock video creation have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for operating a messaging system adapted to send and receive modifiable videos including a self-image of a user, the method comprising:
receiving, by a computing device, a first request from the user to setup the self-image;
providing, on a live image of a camera view, a face outline at a predetermined position in the camera view, the face outline being an approximate size of a face of the user when the user is using the computing device to take the self-image;
receiving, by the computing device, a second request from the user to take the self-image of the user;
displaying, by the computing device, the self-image with the face outline to the user; and
querying, by the computing device, the user whether the face of the user is centered in the face outline, wherein, if the face is not in the face outline, the computing device suggests to the user to retake the self-image.

2. The method of claim 1, further comprising, prior to receiving the second request from the user to take the self-image of the user, providing, by the computing device, instructions to the user, the instructions relating to at least one of a light level, a facial expression, a face position, and a face size.

3. The method of claim 2, wherein the instructions relate to the facial expression, and further comprise providing, by the computing device, a smile measurement corresponding to a current smile level of the user, the smile measurement being displayed relative to a target smile level to enable the user to adjust the current smile level to the target smile level.

4. The method of claim 1, further comprising receiving, by the computing device, a third request from the user to use a previously taken self-image.

5. The method of claim 1, further comprising:
taking, by the computing device, in response to receiving the second request, the self-image of the user;
receiving, by the computing device, a third request from the user to delete the self-image; and
receiving, by the computing device, a fourth request from the user to take one or more additional self-images.

6. The method of claim 1, wherein, if the face is not in the face outline, the computing device asks the user to reposition one of the face and the face outline using one of a gesture control and a touchscreen motion input to the computing device.

7. The method of claim 1, further comprising providing, by the computing device, instructions to the user to complete a face identification scan, the instructions including at least one of:
   directions to turn a head of the user to the right and the left; and
   directions to tilt the head of the user up and down.

8. The method of claim 1, further comprising displaying, by the computing device, the self-image with at least one of a different facial expression, a different body, and different clothing.

9. The method of claim 8, further comprising displaying, by the computing device, the self-image combined with a stock video to form a personalized video, the personalized video including a modified self-image produced based on the self-image, the modified self-image being adjusted to adopt a facial expression corresponding to facial landmark parameters, the modified self-image being inserted in the stock video at a position determined by face area parameters.

10. The method of claim 9, wherein the stock video is created using an actor wearing a mask and facing a video camera recording the stock video, the mask being a marker for insertion of the self-image.

11. The method of claim 10, further comprising uploading the stock video to a database of stock videos, wherein the computing device accesses the database to download the stock video and other stock videos for presentation to the user.

12. The method of claim 11, further comprising:
   displaying, by the computing device, at least one of the stock video and the other stock videos to the user; and
   selecting, by the user, the stock video for combination with the self-image to form the personalized video.

13. A system for operating a messaging system adapted to send and receive modifiable videos including a self-image of a user, the system comprising at least one processor and a memory storing processor-executable codes, wherein the at least one processor is configured to implement the following operations upon executing the processor-executable codes:
   receiving, by a system server, a stock video, the stock video using an actor wearing a mask and facing a video camera recording the stock video, the mask being a marker for insertion of the self-image;
   uploading the stock video by the system server to a database of stock videos, the database accessible by a computing device operated by the user, the computing device adapted to download from the database the stock video and other stock videos for presentation to the user;
   displaying, by the computing device, at least one of the stock video and the other stock videos to the user; and
   selecting by the user the stock video for combination with the self-image to form a personalized video.

14. The system of claim 13, wherein the method further comprises:
   modifying the self-image to form a modified self-image, the modified self-image being adjusted to adopt a facial expression corresponding to facial landmark parameters;
   inserting the modified self-image into the stock video at the marker; and
   displaying, by the computing device, the modified self-image combined with a stock video to form the personalized video.

15. The system of claim 13, wherein the method further comprises:
   receiving, by the computing device, a first request from the user to setup a self-image;
   providing, on a live image of a camera view, a face outline at a predetermined position in the camera view, the face outline being an approximate size of a face of the user when the user is using the computing device to take the self-image; and
   receiving, by the computing device, a second request from the user to take the self-image of the user.

16. The system of claim 13, wherein the method further comprises, prior to receiving the second request from the user to take the self-image of the user, providing, by the computing device, instructions to the user, the instructions relating to at least one of a light level, a facial expression, a face position, and a face size.

17. The system of claim 16, wherein the instructions relate to the facial expression, and further comprising providing, by the computing device, a smile measurement corresponding to a current smile level of the user, the smile measurement being displayed relative to a target smile level to enable the user to adjust the current smile level to the target smile level.

18. A non-transitory processor-readable medium having instructions stored thereon, which when executed by one or more processors, cause the one or more processors to implement a method for operating a messaging system adapted to send and receive modifiable videos including a self-image of a user, the method comprising:
   receiving, by a computing device, a first request from the user to setup a self-image;
   providing, on a live image of a camera view, a face outline at a predetermined position in the camera view, the face outline being an approximate size of a face of the user when the user is using the computing device to take the self-image;
   receiving, by the computing device, a second request from the user to take the self-image of the user;
   displaying, by the computing device, the self-image with the face outline to the user; and
   querying, by the computing device, the user whether the face of the user is centered within the face outline, wherein, if the face is not in the face outline, the computing device suggests to the user to retake the self-image.

19. The non-transitory processor-readable medium of claim 18, wherein, if the face is not in the face outline, the computing device asks the user to reposition one of the face and the face outline using one of a gesture control and a touchscreen motion input to the computing device.

20. The non-transitory processor-readable medium of claim 18, wherein the method further comprises providing, by the computing device, instructions to the user to complete a face identification scan, the instructions including at least one of:
   directions to turn a head of the user to the right and the left; and
   directions to tilt the head of the user up and down.

* * * * *